Patented May 9, 1944

2,348,343

UNITED STATES PATENT OFFICE 2,348,343

PROCESS OF MANUFACTURING FERTILIZERS AND RESULTING FERTILIZER

John O. Holbrook, Columbus, Ohio

No Drawing. Application September 26, 1941,
Serial No. 412,503

9 Claims. (Cl. 71—41)

The invention to be hereinafter described relates to a process of manufacturing fertilizers and the resulting fertilizer.

As is well known, present manufactured fertilizers are made by mixing together various components such as super-phosphates, ammonium salts, nitrates, organics, potash salts and selected alkaline materials such as lime, limestone, cyanamid and ammonia in such proportions and manner as to produce a product having practically no free acid. The particular components for any one desired fertilizer, their proportions, and the order of mixing are public knowledge and, therefore, will not be given in further detail. As is well known, the finished fertilizer is an approximately neutral mixture as shown by well known indicators.

One of the most important requirements or prime essentials of manufactured fertilizers is that they shall flow or drill freely and without clogging or stoppage. They are, of course, applied mechanically or with drills and must flow from the drill hopper or box into and through the drill and drill shoes for delivery in the furrow or trench made by the shoe. Any least clogging in the hopper or stoppage or hesitancy, correspondingly breaks the continuity of the stream and leaves blank gaps unfertilized, or places only thinly fertilized, with resulting irregularity and poorness or weakness in growth along that row, wherever the fertilizer is absent or thin. It has been well established that an excess of fines in the respective fertilizer will cause such clogging. The clogging has been found to increase with increase of the amount of fines over and above an approximate permissible maximum. An extremely fine powdery fertilizer does not flow as regularly and uniformly as will one of a more granular or coarser type, assuming both to have been made in the same way and to have the same formula or composition. Briefly, other factors being the same, the coarser product will flow more readily and with less clogging or interruption. Under pressure, as where bags are stacked, these fines cake, forming masses not readily pulverized by the user, to flow properly. This, of course, is a serious objection and causes loss and dissatisfaction.

The character of the small particles of the mass has a great influence on the ease of flow or fluidity. As mass of coarse sand in a hopper may flow out fairly freely through a drill pipe, due to its weight. An equal volume of chalk, pumice or cork or like light material of the same size and character of particles would clog frequently. The sharp edges, flat faces, and angular walls of the particles catch and cause clogging. So, where the fine particles have no such sharp edges, flat faces, etc., that cause of clogging is removed. Where, instead, the particle surface is smoothed, curved or rounded, a free sliding relation exists between particles, and flow is facilitated. As a result of many tests with fertilizers of a wide range of composition or formulae, applicant has found that the best flow results when the fertilizer is in a granular condition, provided that the small granular particles are approximately in the general form of pellets or balls—i. e. have smooth, curved or rounded surfaces. Marbles or balls flow almost as readily as water, because they roll or slide freely one on another. No one can catch on any other or clog the flow. So, with pellet form of fertilizer, maximum freedom of flow is possible and maximum uniformity of distribution.

Another very important consideration in fertilizers is availability of the plant food elements to the plant. If the fertilizer, after distribution, becomes unavailable or unassimilable to the plants it is, of course, a complete loss and useless. In addition, the labor of applying it has been wasted. It has been conclusively established that very finely divided fertilizer—pulverized or powdered—when distributed in the soil, very rapidly becomes unavailable or unassimilable. Due to its fine condition the chemicals of the soil rapidly reconvert some of its constituents into unassimilable materials while rains or ground waters quickly wash out or leach away the remaining ingredients. On the other hand, it has been equally clearly established that a relatively less fine subdivision—granular or the like—is not reconverted so rapidly nor washed out, nor leached away so rapidly, but remains longer in the soil in available form for assimilation by and nourishment of the plant. The fertilizer of relatively larger particles has, therefore, correspondingly greater availability as a plant food and higher value as a fertilizer. Interesting facts and experiments in this field are set forth under the title "Phosphoric acid in soils, and fertilizing and liming problems in connection therewith" by Olle Franck (abstracted by Firman E. Baer) page 5, No. 1 of vol. 95, of The American Fertilizer, issued July 5, 1941, and in the later article by the same author beginning page 10 of No. 2 of vol. 95 of the same periodical, issued July 19, 1941.

A further important consideration in fertilizers is the use of treble super-phosphate. Manufactured fertilizers containing 18% or more of plant food usually contain phosphates. In many, treble super-phosphate is used. It may be used in any formula in which the analysis shows a content of 12% or more phosphoric acid. It is regularly used to increase available phosphoric acid content to the desired percentage or amount. Treble super-phosphate is not always readily available to the manufacturer in the quantity desired or needed at the time. In addition, it is one of the more expensive phosphate ingredients of fertilizers. So, any thoroughly acceptable substitute for treble super-phosphate is a valuable advance. Any large manufacturer of fertilizers can easily make its own liquid phosphoric acid in any quantity needed for its fertilizer production, having it always available just when needed, with complete elimination of all delays and all storing and handling. The cost of production will be such as to amply warrant its use wherever the treble super-phosphate would otherwise be used in fertilizers. In this way, all objections and draw backs to the use of treble super-phosphate may be completely eliminated.

A considerable number of soils, in addition to requiring one or more of the components usually incorporated in manufactured fertilizers, are deficient in magnesia. It is, therefore, desirable to have incorporated in such fertilizers available magnesia. One of the aims of this invention is to accomplish that result without increasing the cost.

It is the aim and purpose of the present invention to avoid the above and other objections and provide an efficient and economical fertilizer which will have approximately a minimum of fines, will flow freely and regularly with uniform distribution, will remain available as plant food a greater length of time in the soil, will not cake, pack or lump objectionably in bags, will cost no more or even less to make, and will contain ample available magnesia.

In order to disclose the method or process of making this fertilizer, and the preferred components and the relative proportions most desirable, several typical examples are hereinafter set forth.

First, I shall state very briefly, a present typical well known process of making what is known as 20% super-phosphate fertilizer having available only phosphoric acid; a fertilizer containing available phosphoric acid and potash; and a fertilizer containing nitrogen, available phosphoric acid and potash.

High grade ground super-phosphate, analyzing about 18% or 19% available phosphoric acid is built up to 20% by addition of sufficient treble super-phosphate, analysing 45% to 50% available phosphoric acid. Since both of these phosphates contain free phosphoric acid, sufficient alkaline material such as ground limestone, hydrated lime, cyanamid or ammonia is added to neutralize the free phosphoric acid. After thoroughly mixing in a drum, or otherwise, in well known manner, the mixture is dumped on the pile for aging, after which it is remilled and bagged. The product is 20% super-phosphate fertilizer having available only phosphoric acid.

For fertilizers having available phosphoric acid and potash, to the super-phosphate add treble super-phosphate and the desired potash salts and alkaline components, mix and dump on the pile for aging. Then, after aging, remill and bag. Since some of the potash salts are quite alkaline, they may be substituted for a part of the lime or limestone, as will be readily understood.

For fertilizers containing available phosphoric acid, available potash and available nitrogen, simply add, in well known manner, and proportions, cyanamid or ammonia to a fertilizer prepared as above indicated, adjusting the percentage of the several ingredients or components accordingly, of course.

Of course, where there are more components, the relative proportions of the respective components—i. e. their percent relative to the whole product—vary accordingly. Likewise, they vary according to the distinctive characteristics of the respective ingredient or component, all of which is a matter of common knowledge in the industry.

And, too, as is well known, there is an almost unlimited number of formulae even within the three general types above indicated.

A widely known and long recognized objection common to practically all such fertilizers is their excess content of fines with the corresponding objections hereinabove set forth.

And in all instances in which treble super-phosphate is used, the above mentioned objections are involved.

The present invention is particularly applicable to the whole field represented by the several types of fertilizers hereinabove disclosed.

In carrying out the process of this invention, as applied to the fertilizers of the general class hereinabove set forth, the following may be given as examples:

(1) To make one ton of 20% super-phosphate fertilizers having available only phosphoric acid, take 1640 lbs. high grade ground super-phosphate and add 200 lbs. ground dolomite (preferably ground to about 60 mesh). Run these together over a screen and into a mixing drum and mix thoroughly for about one minute. At the end of the mixing add, by injection, 160 lbs. liquid phosphoric acid 50% $P_2O_5$ and continue the mixing for about one minute. This amount of liquid phosphoric acid replaces the treble super-phosphate, otherwise used. Dump the resulting product, convey it to the aging pile and allow to thoroughly cure or age. As the liquid acid strikes the mixture in the drum pellets are formed, mostly from the extreme fines. Obviously, the remaining material is also coated to a greater or less degree. The degree or extent of the coating of material in the drum, especially the finer material and the formation of pellets from the fines, depends, in great part, upon the ability of the liquid acid to penetrate that material. That, in turn, depends upon the viscosity of the acid. If the acid is too viscous, it does not penetrate the material sufficiently. So, the proper viscosity is important in the process. Thus, the commercial concentrated grade analyzing about 54 to 55% $P_2O_5$ should be cut, thinned or made less viscous by addition of water to reduce it to about 50% $P_2O_5$. It has been found that it will then thoroughly penetrate the mass and form approximately all fines into small pellets. Probably the rolling motion of the mixing drum and its contents, together with the agglomerating tendency of the liquid acid, contribute greatly toward the pellet formation. The freshly mixed material, as it is dumped, does not have the free flowing qualities or appearance of the final product. The pellets are still damp and soft looking. But after aging a few days in the pile they harden. The product is then remilled and bagged. It now has the minimum fines, is very free flowing, has all excess fines material in relatively hard free flowing pellet formation, and has much longer life—i. e. it remains longer available in the ground as plant food.

The amount of dolomite is far in excess of that required to neutralize the free acid of the phosphates, leaving the mixture, at that stage, excessively alkaline and with excessive amount of fines. The liquid phosphoric acid eliminates the treble super-phosphate used in the standard mixture, while amply supplying its acid content, and neutralizes the excess alkalinity of the dolomite. At the same time, it is the means of forming the fines into pellets. It is important to note that dolomite is used. Dolomite has a relatively high content of magnesium carbonate from which, on addition of the acid, magnesia becomes soluble and available as a plant food. This is valuable in fertilizers, because many soils are deficient in magnesia. On the other hand, dolomite is as readily obtainable as most lime stones and as low priced, whereas the other lime stones are relatively very low in magnesium content.

Other lime stone, quick lime, hydrated lime, or other alkaline materials such as cyanamid, or ammonia, may be used in place of the dolomite to the extent required to produce the corresponding excess alkalinity. When quick lime or hydrated lime is added in considerable quantities considerable heat is produced and it is advisable to run the mix through a rotary cylinder with fan or blower to remove the heat. It has been found that the speed of pellet formation bears a relation to the alkalinity of the acid neutralizing agent. Where quick lime is used, for instance, it is quicker than where dolomite is used. (2) Among the large number of formulae providing available phosphoric acid and potash, according to this invention may be cited:

| | Pounds |
|---|---|
| Ground super-phospate | 1,170 |
| Treble super-phosphate | 200 |
| Muriate of potash | 330 |
| Ground dolomite | 150 |
| Liquid phosphoric acid 50% $P_2O_5$ | 150 |

All materials except the acid are run together over a screen into a mixing drum and mixed for about one minute. It will be readily understood that due to the use of liquid phosphoric acid, the proportion of potash salts may be increased over that otherwise customary. Then the acid is injected and mixing continued for about one minute, the resulting product dumped, conveyed to the pile, aged, remilled and bagged. It will have substantially the same characteristics, physical characteristics, as the product yielding only available phosphoric acid and magnesia, i. e., the product made under (1), above. The potash of the pellets will not be so readily leached out by the rain or washed out by ground waters, as in the standard type with fines. (3) As an instance of the large number of formulae providing available phosphoric acid, potash and nitrogen, according to this invention, may be cited:

| | Pounds |
|---|---|
| Ground super-phosphate | 1,340 |
| Sulphate of ammonia | 230 |
| Muriate of potash | 130 |
| Cyanamid | 150 |
| Liquid phosphoric acid 50% $P_2O_5$ | 150 |

As in illustrations (1) and (2), above, all constituents except the liquid acid are run over the screen into the drum and mixed for about one minute. Then inject the liquid acid, continuing the mixing for about one minute. Due to the considerable heat generated, the resulting product should be run through a cooling cylinder with blower or fan draft on its way to dumping and piling. Fertilizer run into the pile while still heated does not cure so well or so satisfactorily and sometimes reverts. After aging it is remilled and bagged. Here, again, the pellet form, which, in this instance, contains the nitrogen and potash as well as the available phosphoric acid or phosphates, will last longer in the soil. The pellet form will greatly retard the normal rapid leaching out of nitrogen and potash now current in manufactured fertilizers. Here, again, when considerable amounts of ammonia or cyanamid are used, the resulting heat makes it advisable to cool the product before piling. I have found that a part of the cyanamid in the above formula may be satisfactorily replaced by ammonia, either aqua or anhydrous. When the price of ammonia makes such replacement economical, all ingredients except the ammonia and phosphoric acid are mixed, then the phosphoric acid is injected and mixed and, finally, the ammonia is added and mixed. The resulting product has substantially the same physical characteristics as that in which there was no such replacement.

In formulae producing fertilizers analyzing 12% or over, available phosphoric acid, liquid phosphoric acid of about 50% $P_2O_5$ strength is preferable. For formulae producing fertilizers analyzing less available phosphoric acid, a weaker solution of the liquid phosphoric acid is more economical. In these formulae of lower analyses, quick lime or pulverized cyanamid would be used because pellet formation is quicker under such conditions, as previously stated. The resulting heat would be removed before piling, as previously explained.

The materials, order and process of mixing, the proportions in which they are to be used, and the resulting product, will be clear from the preceding description. As indicated, many variations in materials, in proportions, and in the order or sequence of the mixing and other steps of the process are permissible, within the field of the invention and it is meant to include all such within this application wherein only a few typical formulae have been disclosed merely by way of illustration and with no intention to in any degree limit the scope of any of the claims thereby.

Having thus described my invention, what I claim and desire to protect by Letters Patent is.

1. A fertilizer manufacturing process comprising dry-mixing ground superphosphate and a ground alkaline material selected from the class consisting of dolomite, limestone, hydrated lime, quick lime, and cyanamid and said materials admixed with potash, in such proportions as to provide a substantial excess of the alkaline material above that required to neutralize the free phosphoric acid of the superphosphate, continuing to mix while adding concentrated liquid phosphoric acid in such a quantity that substantially homogeneous pellets are formed by the nodulizing effect of the mixing action and the liquid phosphoric acid but in quantity no more than that required to approximately completely neutralize the excess alkaline material, and maintaining the temperature of the mixture from rising to a substantial extent.

2. A fertilizer manufacturing process comprising dry-mixing ground superphosphate and ground dolomite, in such proportions as to provide a substantial excess of the alkaline material above that required to neutralize the free phosphoric acid of the superphosphate, continuing to mix while adding concentrated liquid phosphoric acid in such quantity that substantially homogeneous pellets are formed by the nodulizing effect of the mixing action and the liquid phosphoric acid but in quantity no more than that required to approximately completely neutralize the excess alkaline material, and maintaining the temperature of the mixture from rising to a substantial extent.

3. A fertilizer manufacturing process comprising dry-mixing ground superphosphate and ground lime, in such proportions as to provide a substantial excess of the alkaline material above that required to neutralize the free phosphoric acid of the superphosphate, continuing to mix while adding concentrated liquid phosphoric acid in such a quantity that substantially homogeneous pellets are formed by the nodulizing effect of the mixing action and the liquid phosphoric acid but in quantity no more than that required to approximately completely neutralize the excess alkaline material, and maintaining the temperature of the mixture from rising to a substantial extent.

4. A fertilizer manufacturing process comprising dry-mixing ground superphosphate and ground cyanamid, in such proportions as to provide a substantial excess of the alkaline material above that required to neutralize the free phosphoric acid of the superphosphate, continuing to mix while adding concentrated liquid phosphoric acid in such a quantity that substantially homogeneous pellets are formed by the nodulizing effect of the mixing action and the liquid phosphoric acid but in quantity no more than that required to approximately completely neutralize the excess alkaline material, and maintaining the temperature of the mixture from rising to a substantial extent.

5. A fertilizer manufacturing process comprising dry-mixing ground superphosphate and a ground alkaline material selected from the class consisting of dolomite, limestone, hydrated lime, quick lime and cyanamid and said materials admixed with potash, in such proportions as to provide a substantial excess of the alkaline material above that required to neutralize the free phosphoric acid of the superphosphate, continuing to mix while adding concentrated liquid phosphoric acid of approximately 50% $P_2O_5$ in such a quantity that substantially homogeneous pellets are formed by the nodulizing effect of the mixing action and the liquid phosphoric acid but in quantity no more than that required to approximately completely neutralize the excess alkaline material, and maintaining the temperature from rising to a substantial extent.

6. A manufactured fertilizer comprising free flowing, substantially homogeneous, dry pellets consisting of the reaction products of a ground superphosphate, a ground alkaline material selected from the class consisting of dolomite, limestone, hydrated lime, quick lime and cyanamid and said materials admixed with potash, in such proportions as to provide a substantial excess of alkaline material above that required to neutralize the free phosphoric acid of the superphosphate and concentrated liquid phosphoric acid in such a quantity that substantially homogeneous pellets are formed by the nodulizing effect of the mixing action and the liquid phosphoric acid but in quantity no more than required to approximately completely neutralize the excess alkaline material, the temperature of the mixture being maintained from rising to a substantial extent during mixing.

7. A manufactured fertilizer comprising free flowing, substantially homogeneous, dry pellets consisting of the reaction products of a ground superphosphate, ground dolomite, in such proportions as to provide a substantial excess of the alkaline material above that required to neutralize the free phosphoric acid of the superphosphate and concentrated liquid phosphoric acid in such a quantity that substantially homogeneous pellets are formed by the nodulizing effect of the mixing action and the liquid phosphoric acid but in quantity no more than required to approximately completely neutralize the excess alkaline material, the temperature of the mixture being maintained from rising to a substantial extent during mixing.

8. A manufactured fertilizer comprising free flowing, substantially homogeneous, dry pellets consisting of the reaction products of a ground superphosphate, ground lime, in such proportions as to provide a substantial excess of alkaline material above that required to neutralize the free phosphoric acid of the superphosphate and concentrated liquid phosphoric acid in such a quantity that substantially homogeneous pellets are formed by the nodulizing effect of the mixing action and the liquid phosphoric acid but in quantity no more than required to approximately completely neutralize the excess alkaline material, the temperature of the mixture being maintained from rising to a substantial extent during mixing.

9. A manufactured fertilizer comprising free flowing, substantially homogeneous, dry pellets consisting of the reaction products of a ground superphosphate, ground cyanamid, in such proportions as to provide a substantial excess of the alkaline material above that required to neutralize the free phosphoric acid of the superphosphate and concentrated liquid phosphoric acid in such a quantity that substantially homogeneous pellets are formed by the nodulizing effect of the mixing action and the liquid phosphoric acid but in quantity no more than required to approximately completely neutralize the excess alkaline material, the temperature of the mixture being maintained from rising to a substantial extent during mixing.

JOHN O. HOLBROOK.